(12) United States Patent
van Dalen et al.

(10) Patent No.: US 11,039,604 B2
(45) Date of Patent: Jun. 22, 2021

(54) LAYING NEST WITH RACK DRIVE FLOOR EXPULSION SYSTEM

(71) Applicant: CTB, Inc., Milford, IN (US)

(72) Inventors: H. G. van Dalen, Arnhem (NL); Frank Luttels, Beesel (NL); Johannes Albert Donker, Woudenberg (NL)

(73) Assignee: CTB, Inc., Milford, IN (US)

( * ) Notice: Subject to any disclaimer, the term of this patent is extended or adjusted under 35 U.S.C. 154(b) by 0 days.

(21) Appl. No.: 15/881,759

(22) Filed: Jan. 27, 2018

(65) Prior Publication Data

US 2018/0249684 A1    Sep. 6, 2018

Related U.S. Application Data

(60) Provisional application No. 62/451,500, filed on Jan. 27, 2017.

(51) Int. Cl.
| | |
|---|---|
| *A01K 31/14* | (2006.01) |
| *A01K 31/16* | (2006.01) |
| *A01K 31/06* | (2006.01) |
| *A01K 31/10* | (2006.01) |
| *A01K 31/00* | (2006.01) |
| *A01K 31/17* | (2006.01) |
| *A01K 1/00* | (2006.01) |

(52) U.S. Cl.
CPC ............ *A01K 31/16* (2013.01); *A01K 1/0029* (2013.01); *A01K 31/00* (2013.01); *A01K 31/06* (2013.01); *A01K 31/10* (2013.01); *A01K 31/14* (2013.01); *A01K 31/165* (2013.01); *A01K 31/17* (2013.01)

(58) Field of Classification Search
CPC ....... A01K 31/14; A01K 31/16; A01K 31/165

USPC ......................... 119/329, 341, 342, 343, 346
See application file for complete search history.

(56) References Cited

U.S. PATENT DOCUMENTS

| | | | |
|---|---|---|---|
| 663,916 A | 12/1900 | Markwell et al. | |
| 902,056 A | 10/1908 | Crosley | |
| 1,217,721 A | 2/1917 | Drake | |
| 1,434,271 A | 10/1922 | Van Orden | |
| 1,443,609 A | 1/1923 | Onslow et al. | |
| 1,467,622 A | 9/1923 | McMurphy | |
| 1,523,256 A | 1/1925 | Butler | |

(Continued)

FOREIGN PATENT DOCUMENTS

| | | |
|---|---|---|
| EP | 2916649 B1 | 9/2016 |
| NL | 9301627 A | 4/1995 |

(Continued)

OTHER PUBLICATIONS

Valego Nest Systems for Layers, marketing handout, CT-2625/201701, Chore-Time, USA.

*Primary Examiner* — David J Parsley
(74) *Attorney, Agent, or Firm* — Clark Hill PLC; Adam J. Fromm

(57) ABSTRACT

This invention relates to laying nest having a rack drive expulsion system. As disclosed herein, the invention preferably comprises a laying nest for hens comprising a box and a rack drive floor expulsion system. The floor pivotably moves between first and second positions by virtue of a gear rack that is fixedly connected to and disposed within the box, and a gear wheel that is rotatably connected to the floor. Accordingly, the expulsion system provides for the selected removal of hens from the laying nests as desired.

16 Claims, 13 Drawing Sheets

(56) References Cited

U.S. PATENT DOCUMENTS

| | | |
|---|---|---|
| 2,195,702 A | 4/1940 | Kent |
| 2,264,156 A | 11/1941 | Apple |
| 2,539,052 A | 1/1951 | Birley |
| 2,620,589 A | 12/1952 | Jones |
| 2,676,566 A | 4/1954 | Krieger |
| 2,692,578 A | 10/1954 | Manning |
| 2,737,926 A | 3/1956 | Maness |
| 2,833,246 A | 5/1958 | Weber |
| 3,027,871 A | 4/1962 | Peterson |
| 3,046,940 A | 7/1962 | Kurtz |
| 3,111,215 A | 11/1963 | Tellefson |
| 3,118,425 A | 1/1964 | Kurtz |
| 3,157,156 A | 11/1964 | Peterson et al. |
| 3,164,129 A | 1/1965 | Rigterink |
| 3,183,889 A | 5/1965 | Peterson et al. |
| 3,234,909 A * | 2/1966 | Graves .................. A01K 31/16 119/337 |
| 3,237,601 A | 3/1966 | Sandberg |
| 3,292,583 A | 12/1966 | Peterson |
| 3,465,723 A | 9/1969 | Matunaga |
| 3,650,246 A | 3/1972 | Fowler et al. |
| 3,941,091 A | 3/1976 | Fleshman |
| 4,188,911 A | 2/1980 | Rafaely |
| 4,381,732 A | 5/1983 | Hulsinga |
| 4,425,127 A | 1/1984 | Suzuki et al. |
| 4,800,677 A | 1/1989 | Mack |
| 4,800,841 A | 1/1989 | Yananton et al. |
| 4,852,518 A | 8/1989 | Yananton |
| 4,869,204 A | 9/1989 | Yananton |
| 4,892,528 A | 1/1990 | Suzuki et al. |
| 5,058,530 A | 10/1991 | Van De Ven |
| 5,217,447 A | 6/1993 | Gagnon |
| 5,222,459 A | 6/1993 | Johnson |
| 5,429,632 A | 7/1995 | Tanji et al. |
| 5,555,847 A | 9/1996 | Kelly |
| 5,624,424 A | 4/1997 | Saisaka et al. |
| 5,626,097 A * | 5/1997 | Mast .................. A01K 31/16 119/339 |
| 5,715,772 A | 2/1998 | Kamrath et al. |
| 5,950,564 A | 9/1999 | Meron |
| 6,090,730 A | 7/2000 | Fujiwara et al. |
| 6,234,114 B1 | 5/2001 | Dyer |
| 6,244,216 B1 | 6/2001 | Ochi |
| 6,550,423 B1 | 4/2003 | Pope |
| 6,578,520 B2 | 6/2003 | Otsuji et al. |
| 6,635,798 B1 | 10/2003 | Yoshioka et al. |
| 8,101,815 B2 | 1/2012 | Kaneko et al. |
| 9,510,567 B2 | 12/2016 | Donker et al. |
| 2002/0000206 A1 | 1/2002 | Ikegami et al. |
| 2003/0094140 A1 | 5/2003 | Otsuji et al. |
| 2004/0054331 A1 | 3/2004 | Hamilton et al. |
| 2004/0144326 A1 | 7/2004 | Smith |
| 2004/0255869 A1 | 12/2004 | Matsuo et al. |
| 2005/0166855 A1 | 8/2005 | Kaneko et al. |
| 2005/0166856 A1 | 8/2005 | Kaneko et al. |
| 2006/0200105 A1 | 9/2006 | Takahashi et al. |
| 2008/0173250 A1 | 7/2008 | Dowty |
| 2009/0000557 A1 | 1/2009 | Takahashi et al. |
| 2009/0000561 A1 | 1/2009 | Takahashi et al. |
| 2009/0044756 A1 | 2/2009 | Otsuji et al. |
| 2011/0146581 A1 | 6/2011 | Sasano et al. |
| 2014/0338607 A1 | 5/2014 | Takagi et al. |
| 2015/0027380 A1 | 1/2015 | Sasano et al. |
| 2015/0136035 A1 | 5/2015 | Yakahashi et al. |
| 2015/0150212 A1 | 6/2015 | Takagi et al. |
| 2015/0164038 A1 | 6/2015 | Takagi et al. |
| 2015/0189852 A1 | 7/2015 | Takagi et al. |
| 2015/0201579 A1 | 7/2015 | Takagi et al. |

FOREIGN PATENT DOCUMENTS

| | | |
|---|---|---|
| NL | 2009780 C | 5/2014 |
| WO | 2014072945 A1 | 5/2014 |

* cited by examiner

LAYING NEST WITH RACK DRIVE FLOOR EXPULSION SYSTEM

CROSS REFERENCE TO RELATED APPLICATIONS

This application claims priority to, and the benefit of, U.S. Provisional Patent Application Ser. No. 62/451,500 filed on Jan. 27, 2017.

FIELD OF THE INVENTION

This invention relates to a laying nest having a rack drive expulsion system. In general, an expulsion system provides for the selected removal of hens from the laying nests as desired. Typically this removal is accomplished in the evening so that the hens cannot sleep in the egg laying nests at night.

BACKGROUND OF THE INVENTION

Known expulsion systems include a torsion expulsion system and a gear rack expulsion system. As shown in FIGS. 1 and 2, the gear rack system is typically a system comprising a drive shaft 1 arranged in a fixed position, which is provided at several positions with gear wheels 2 fixedly connected with the drive shaft 1. The gear wheels 2 engage gear racks 3 associated with them. The gear racks 3 are connected by one end to the bottom 4 of the box 7 of the laying nest 6. The bottom 4 is pivotally arranged and can be pushed by the gear rack 3 from a substantially horizontal position to a substantially vertical position upon rotation of the drive shaft 1. As a result, hens that have entered the laying nest 6 cannot continue sitting in the box 7. FIGS. 1 and 2 respectively show a perspective view and a side elevational view of an exemplary prior art laying nest 6 with a typical gear rack 3 expulsion system.

As shown in FIG. 3, a typical prior art torsion expulsion system comprises an expulsion plate 7a, b which is fixedly mounted to a tube 8. The tube 8 is in a fixed position and is rotatable about its axis. As soon as the tube 8 is rotated, the expulsion plate 7a, b pivots along with it and pushes hens out of the system. FIG. 3 shows a side elevational view of an example of the torsion system. In that example the expulsion plate 7a, b is designed in two parts 7a, 7b which are pivotable relative to each other. Through this construction, an opening (via which eggs laid by the hens roll from a box 9 to the egg conveyor) is not blocked by the expulsion plate 7a, b when the latter is situated in a position against a back wall of the box 9, as shown in the left-hand box 9 of FIG. 3. As shown in the right-hand box 9 of FIG. 3, the expulsion plate 7a, b is shown in an intermediate position and in an end position.

The Netherlands Patent Number 9,301,627 describes a hybrid expulsion system, which is a combination of a gear rack system and a torsion system, whereby a drive shaft arranged in a fixed position is provided with gear wheels which are engaged by movably arranged gear racks. The gear racks have one end indirectly connected to a pivotally arranged expulsion plate.

U.S. Pat. No. 9,510,567 (the "'567 patent"), which is also owned by the assignee of the present application, addresses some of the shortcomings of earlier prior art expulsion systems. For example, one associated problem with the gear rack expulsion system is that it needs to lift the full weight of all hens plus the bottoms of the nests to drive the hens out of the boxes of the laying nests. This requires a heavy-duty drive, which is unfavorable from a cost perspective. Moreover, the bottoms and the gear racks need to be of a relatively heavy-duty design to be able to resist the forces occurring upon upward pivoting of the bottoms and the chickens present thereon. Also, some prior art gear rack systems with a movable rack include a design wherein the rack extends below the box (e.g., see FIGS. 1 and 2) and thus minimizes the ability to stack multiple boxes together in a space-efficient manner due to the fact that the rack was disposed at least part of the time outside of the nest and box.

As shown and described in the '567 patent, FIG. 4 shows a perspective view of a laying nest 10 with an expulsion system shown therein. The laying nest 10 comprises boxes 12 having at least a bottom 24, sidewalls 18, a back wall 22, and a roof 20. The bottoms 24 of the boxes 12 are disposed so as to slope to some extent, so that eggs upon being laid roll automatically to the lowest point of the bottom 24 and are discharged from the respective box 12 to a collecting space 16. In general, such a collecting space 16 is provided with a conveyor belt or chain conveyor with the aid of which the eggs can be conveyed to an end of the laying nest 10 for further processing. The collecting space 16 is not accessible to the hens. As further shown in FIG. 4, a sidewall 18 of the collecting space 16 is omitted in order to make somewhat more detail of the laying nest 10 visible. In the example shown, there are two series of boxes 12, each adjoining the single collecting space 16. The laying nest 10 is provided with an expulsion system for driving the hens out of the boxes 12. This is desirable, for instance at night, to prevent soiling of the boxes 12 by the hens.

The expulsion system of the '567 patent is shown in more detail in FIGS. 5-10. As shown, the expulsion system comprises at least one shaft 26, which is provided with at least one gear wheel 28, which is fixedly connected with the shaft 26. Further, the expulsion system comprises at least one expulsion plate 30 which is rotatably connected with the shaft 26. The expulsion plate 30 is further pivotally and slidably connected via a support shaft 32 with the box 12. To that end, the sidewalls 18 are provided with a vertical slot 36 in which the support shaft 32 is received. This expulsion system further comprises at least one gear rack 34 which is fixedly disposed in the box 12, and which is configured for cooperation with the above-mentioned gear wheel 28, such that upon rotation of the shaft 26 the gear wheel 28 moves along the gear rack 34, thereby carrying along the expulsion plate 30. In the example shown in FIGS. 5-10, the gear racks 34 are each connected with an associated sidewall 18. It is also possible, however, that the gear racks 34 are connected with a frame part of the laying nest 10.

FIG. 7 shows a side elevation of the example of the laying nest 10 represented in FIG. 4, with omission of the sidewall 18 of the right-hand series of boxes 12. Clearly visible is the expulsion plate 30 which is a first end position. In this first end position the hens can reach the bottom 24 of the boxes 12 via an entrance opening 42.

FIG. 8 shows detail VIII from FIG. 7, with the expulsion plate 30 in the first end position.

FIG. 9 shows a similar detail to detail VIII, but now it is clearly visible that the shaft 26 has moved along the gear rack 34 to the right and the expulsion plate 30 is in an intermediate position. Also, it is clearly visible that the support shaft 32 has moved up in the slot 36. Further, it is clear that a lower edge 30a of the expulsion plate 30 is situated closely above the bottom 24. Accordingly, the hens cannot slip through between the lower edge 30a and the bottom 24. Also, dead hens will be shoved off the bottom 24 by the expulsion plate 30.

FIG. 10 shows that the expulsion plate 30 is in a second end position. The lower edge 30a of the expulsion plate 30 now adjoins an upper edge 38 of a front wall 40 of the box 12, which bounds the entrance opening 42 for the hens to enter the box 12. The hens now cannot reach the bottom 24 anymore and have been driven out of the box 12. It is clearly visible that in the second end position the shaft 26 with the gear wheel 28 has moved all the way to the right. The support shaft 32 now sits at the bottom of the slot 36 again.

The expulsion plate 30 of the laying nest 10 may be designed as a wire mesh mat. A wire mesh mat consists of metal bars which are mutually connected. Thus, the bars may, for instance, extend perpendicularly to each other and be interconnected by welding. The mutual distance between the parallel bars can be in the range of, for instance, 5-10 centimeters ("cm") so that the openings between the bars cannot be passed by the hens. Instead of being implemented as a wire mesh mat, the expulsion plate 30 may also be formed by a plank of plastic or wood. The expulsion plate 30 need not necessarily be of a planar design. It is also possible that the expulsion plate 30 is of a curved design or does not have a uniform thickness throughout.

The '567 patent also addresses a shortcoming of prior art torsion systems (see FIG. 3) where a lower edge of the expulsion plate during the pivoting movement is at such a large distance from the bottom of the box that the possibility of chickens passing under the edge and then remaining behind in the box cannot be precluded. Also, that system does not always manage to remove dead hens from the box because of this gap between the expulsion plate and the bottom of the box.

In view of the prior art, there exists a need for a laying nest expulsion system that reliably and effectively removes hens from the laying nest as desired, wherein the system comprises fewer moving parts, requires less operating (drive) power, is highly versatile (i.e, stackable), and provides for improved desoiling of the system, particularly the system floor.

SUMMARY OF THE INVENTION

To meet the needs described above, the present disclosure provides a laying nest with a rack drive expulsion system comprising:

A laying nest for hens comprising:

a box having a bottom, sidewalls, a back wall, and a roof, wherein the box is configured to house hens and eggs;

an expulsion system that is configured to remove the hens from the box, wherein the expulsion system comprises:

a floor;

a first shaft provided with a gear wheel having a plurality of teeth, the gear wheel being fixedly connected with the first shaft;

a gear rack having a plurality of teeth that correspond to the teeth of the gear wheel; and a second shaft having an axis;

wherein the floor is both rotatably connected with the first shaft and pivotably connected with the box via the second shaft;

wherein the gear rack is both fixedly arranged in the box and configured for cooperation with said gear wheel;

wherein upon rotation of the first shaft, the first shaft moves along a path extending parallel to the gear rack, thereby pivotably moving the floor by virtue of the first shaft moving along the path extending parallel to the gear rack and the second shaft pivoting around the axis.

DETAILED DESCRIPTION OF THE EMBODIMENTS

While the present invention may be susceptible to embodiment in different forms, there is described herein in detail, specific preferred embodiments with the understanding that the present disclosure is to be considered an exemplification of the principles of the invention, and is not intended to limit the invention to that described herein.

The rack drive floor expulsion system provided in accordance with preferred embodiments of the present invention overcomes the above described problems associated with prior art torsion and gear rack expulsion systems. For example, advantageously, the design of preferred embodiments of the present system allow for the optimization of overall system height because no space is lost underneath the nesting and box areas because the racks are disposed in a manner such that they do not occupy space below the nest, nor do they protrude therefrom. Moreover, the present system is a novel and inventive rack drive floor expulsion system that comprises fewer moving parts, requires less operating (drive) power, and provides for improved desoiling of the system, particularly the system floor.

Figure 1:
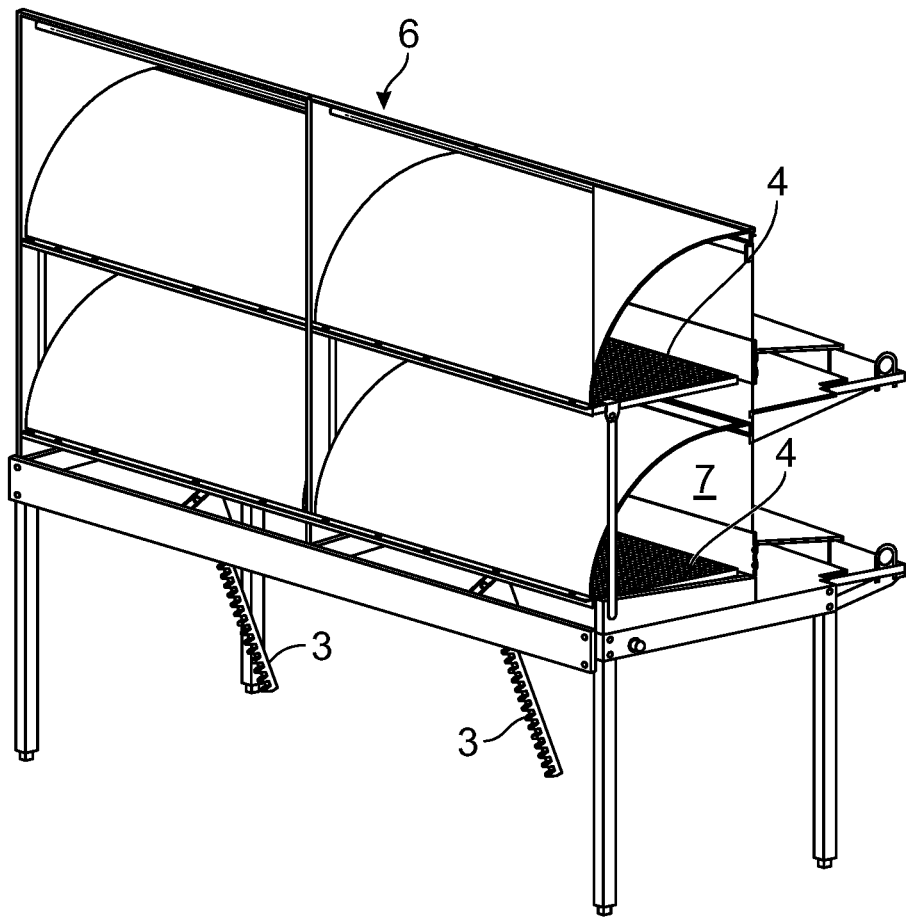
FIG. 1 shows a perspective view of a prior art laying nest comprising a gear rack expulsion system.
Figure 2:
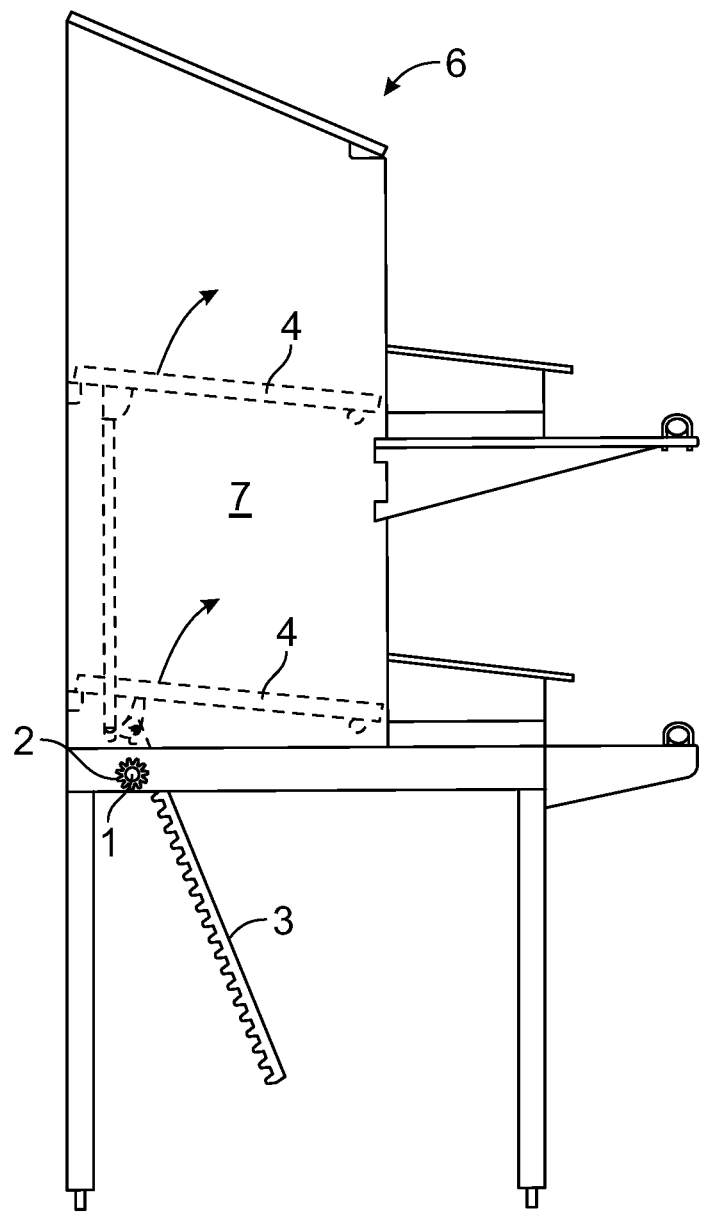
FIG. 2 shows a side elevational view of the prior art laying nest of FIG. 1.
Figure 3:
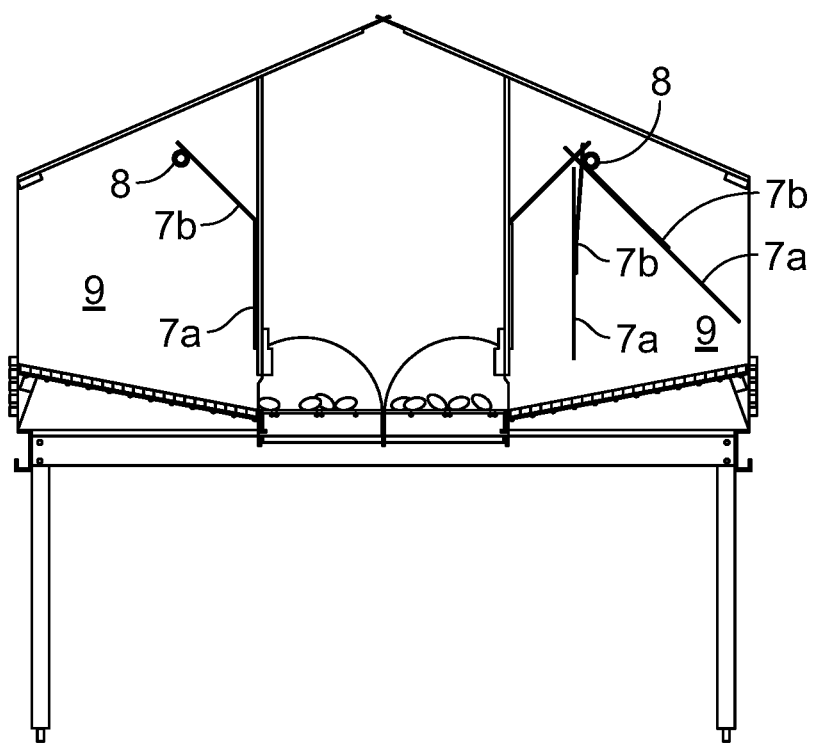
FIG. 3 shows a side elevational view of a prior art laying nest comprising a torsion expulsion system.
Figure 4:
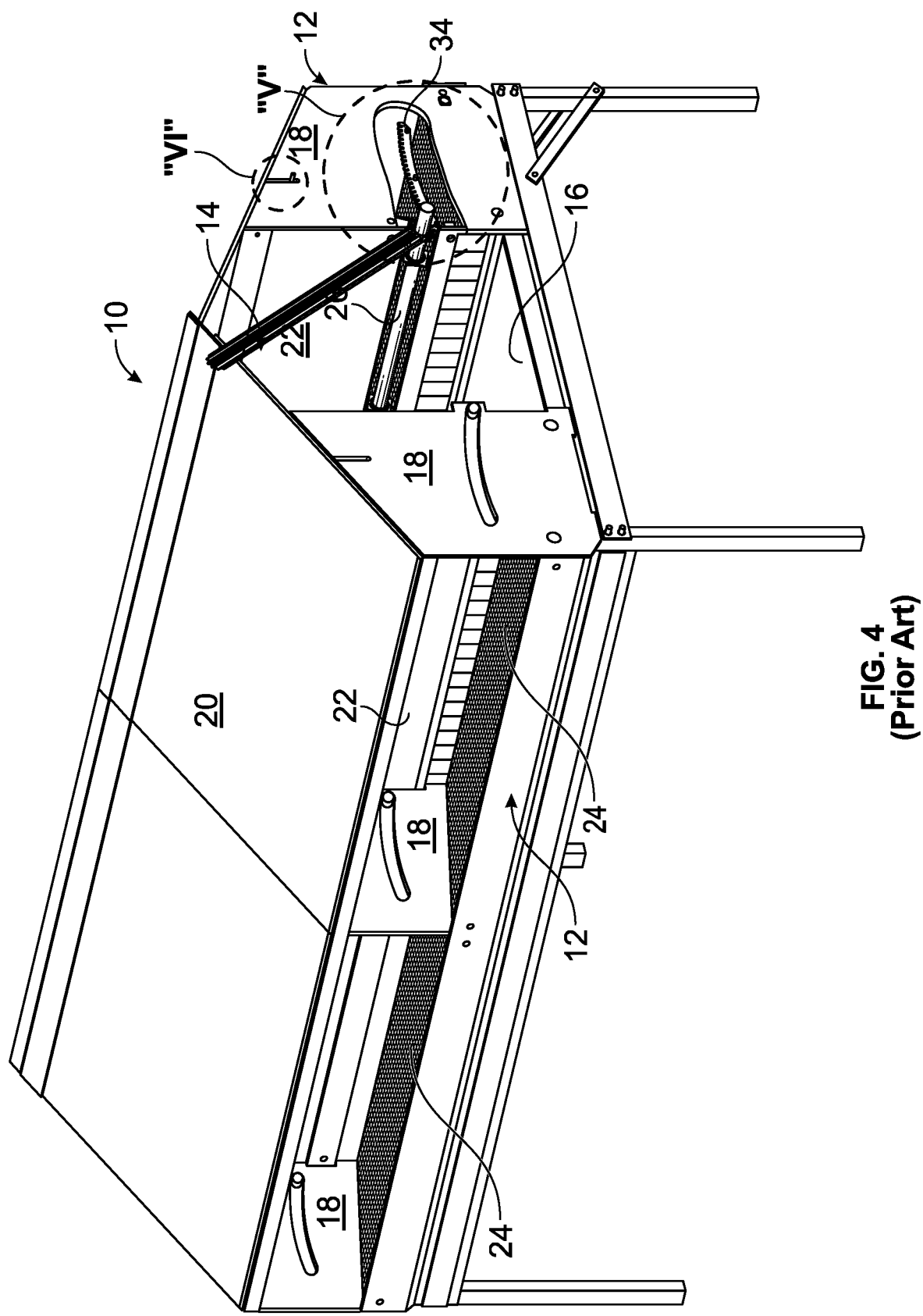
FIG. 4 shows in perspective view of another example of a prior art laying nest having an expulsion system with a rack disposed inside the nest area.
Figure 5:
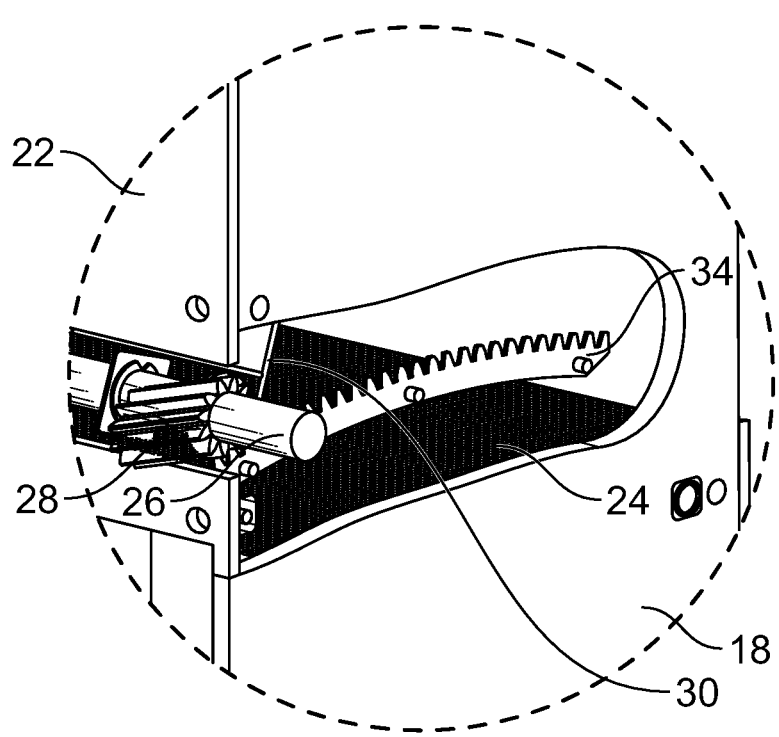
FIG. 5 shows detail V of the prior art FIG. 4.
Figure 6:
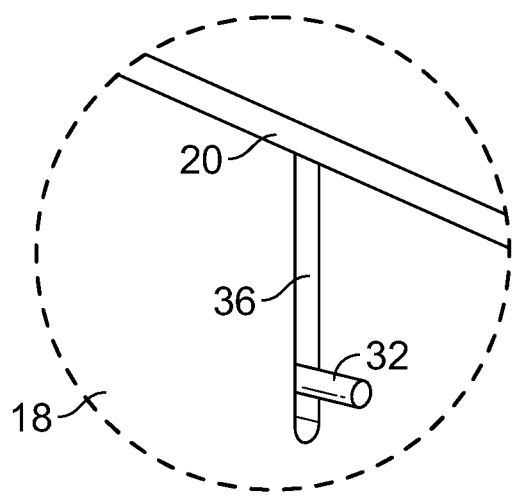
FIG. 6 shows detail VI of the prior art FIG. 4.
Figure 7:
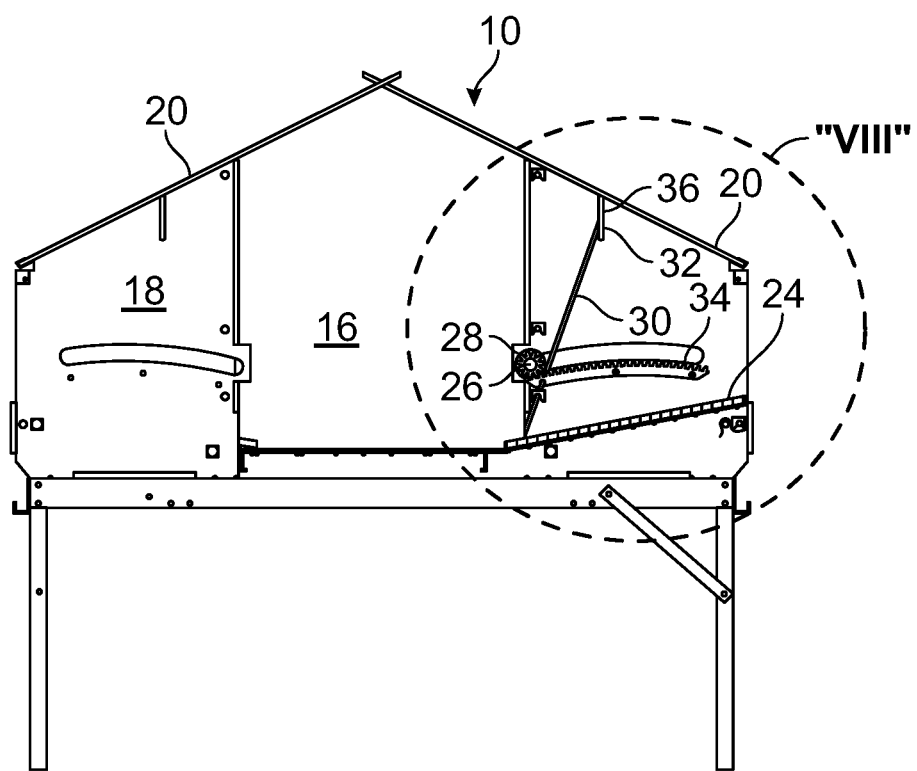
FIG. 7 shows a side elevational view of the prior art FIG. 4, with a sidewall of the right-hand box removed for clarity.
Figure 8:
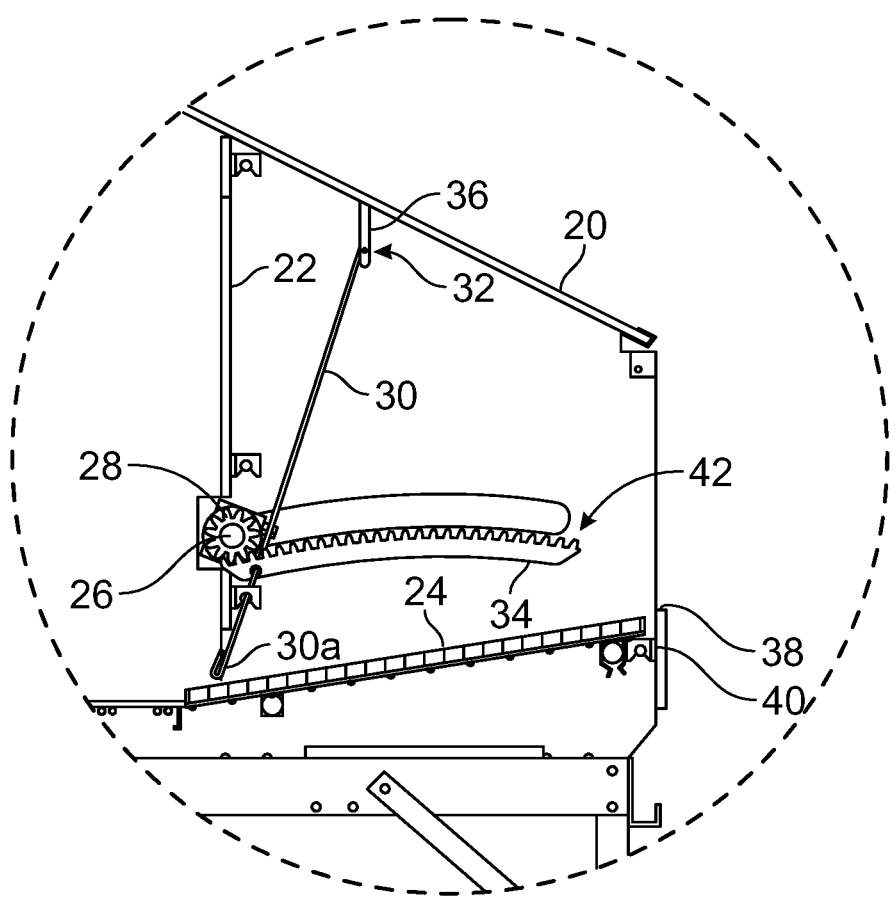
FIG. 8 shows detail VIII of the prior art FIG. 7 with the expulsion plate in a first end position.
Figure 9:
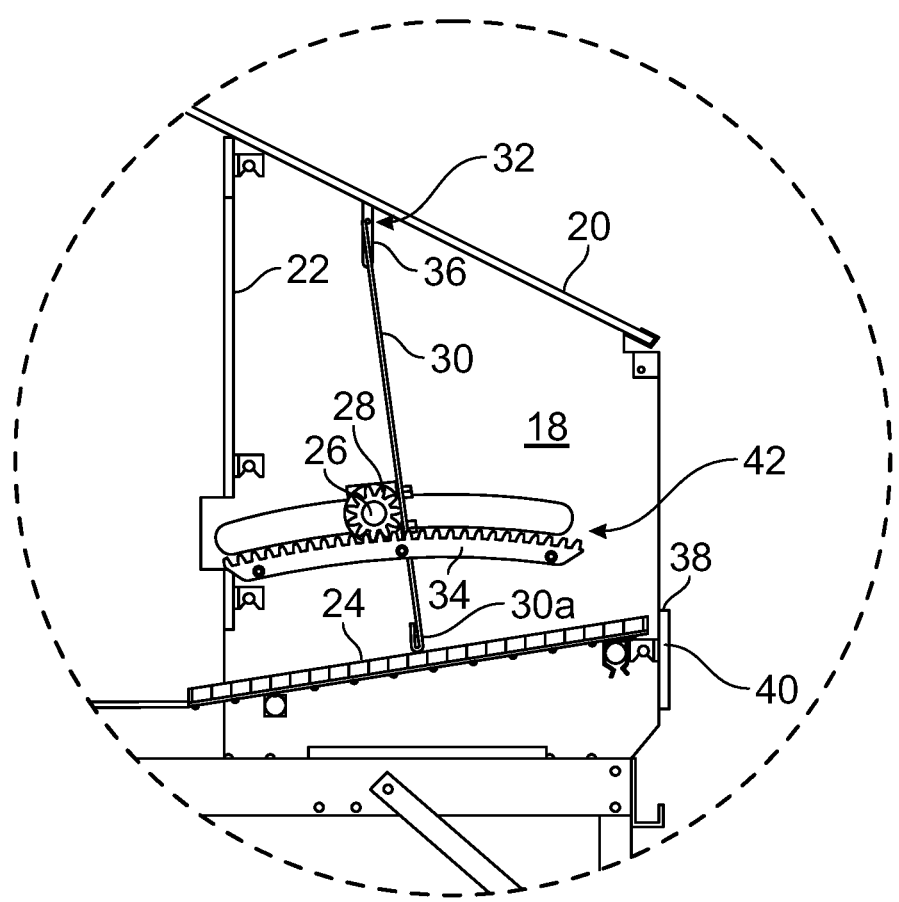
FIG. 9 shows a view similar to detail VIII of the prior art FIG. 7, the view showing the expulsion plate in an intermediate position.
Figure 10:
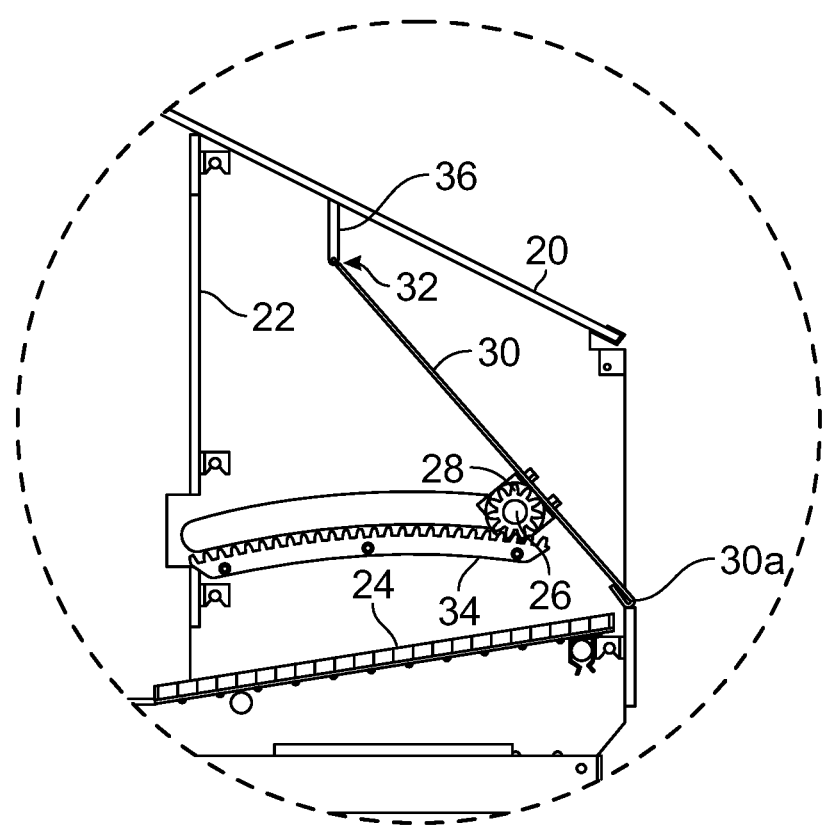
FIG. 10 shows a similar view to detail VIII of the prior art FIG. 7, the view showing the expulsion plate in a second end position.

The expulsion system of the present invention is optionally designed for use with a laying nest system as previously shown and described with reference to the '567 patent and FIG. 4, as will be appreciated by one of ordinary skill in the art.

Figure 11:
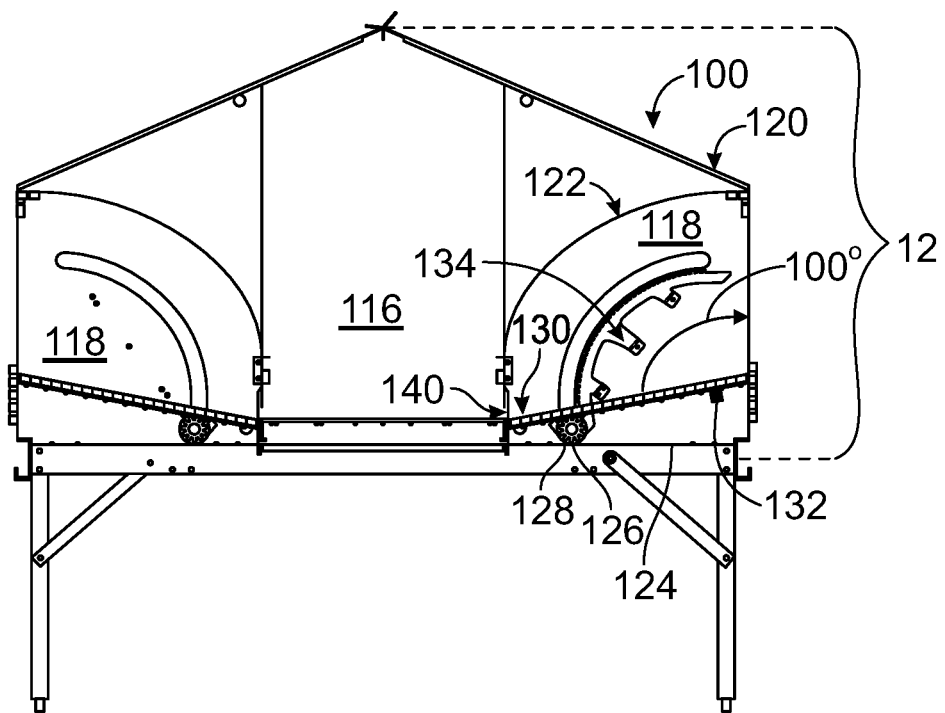
FIG. 11 shows a side elevational view of a laying nest having a rack drive floor expulsion system provided in accordance with a preferred embodiment of the present invention, with a sidewall of the right-hand box removed for clarity, the floor of the expulsion system being shown in a downward orientation.
Figure 12:
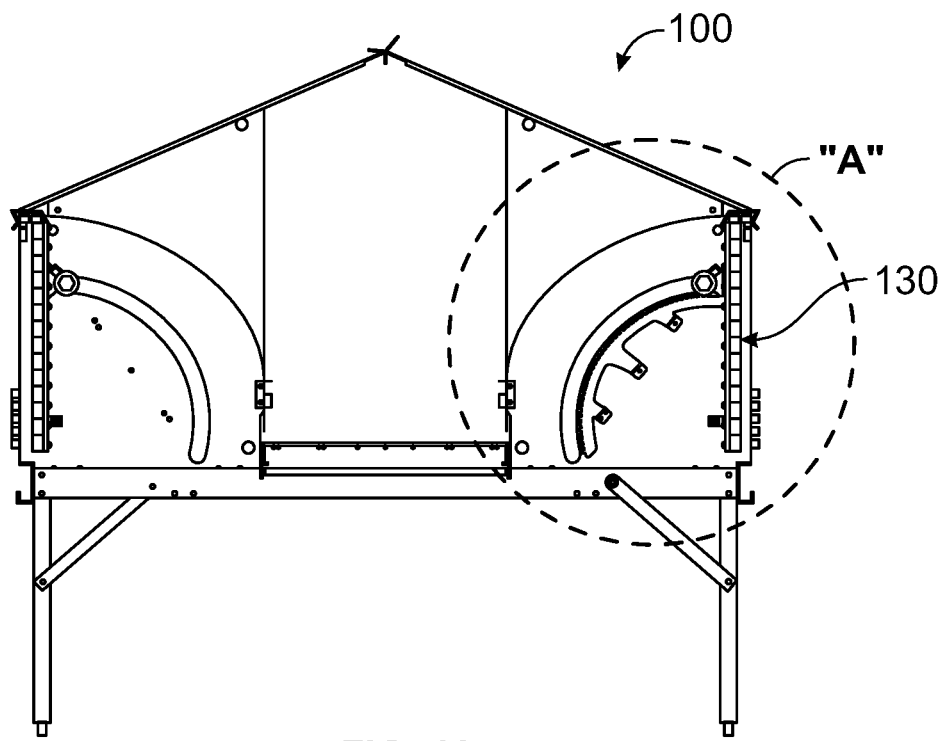
FIG. 12 shows a side elevational view of the laying nest shown in FIG. 11, with a sidewall of the right-hand box removed for clarity, the floor of the expulsion system being shown in an upward orientation.

A laying nest which may also be used with the present rack drive floor expulsion system is shown in FIGS. 11 and 12. As shown in FIGS. 11 and 12, a laying nest 100 with rack floor expulsion system is provided in accordance with preferred embodiments of the present invention. The laying nest 100 comprises boxes 112 having a bottom 124, sidewalls 118, a back wall 122, a roof 120. The nest 100 further comprises a floor 130. In a preferred embodiment of the present invention, the floor 130 is implemented as a wire mesh mat. The floor 130 of the box 112 is disposed so as to slope to some extent, so that eggs upon being laid roll automatically to the lowest point of the floor 130 and are discharged from the respective box 112 to a collecting space 116. The box 112 defines an opening 140 configured to allow the eggs to roll out of the box 112 into the collecting space 116. The box further defines a front opening 150 where hens will enter and exit the box 112. In general, such a collecting space 116 is provided with a conveyor belt or chain conveyor with the aid of which the eggs can be conveyed to an end of the laying nest for further processing. The collecting space 116 is not accessible to the hens. As shown in FIGS. 11 and 12, a sidewall 118 of the collecting space 116 is omitted in order to make somewhat more detail of the laying nest 100 visible.

Figure 13:
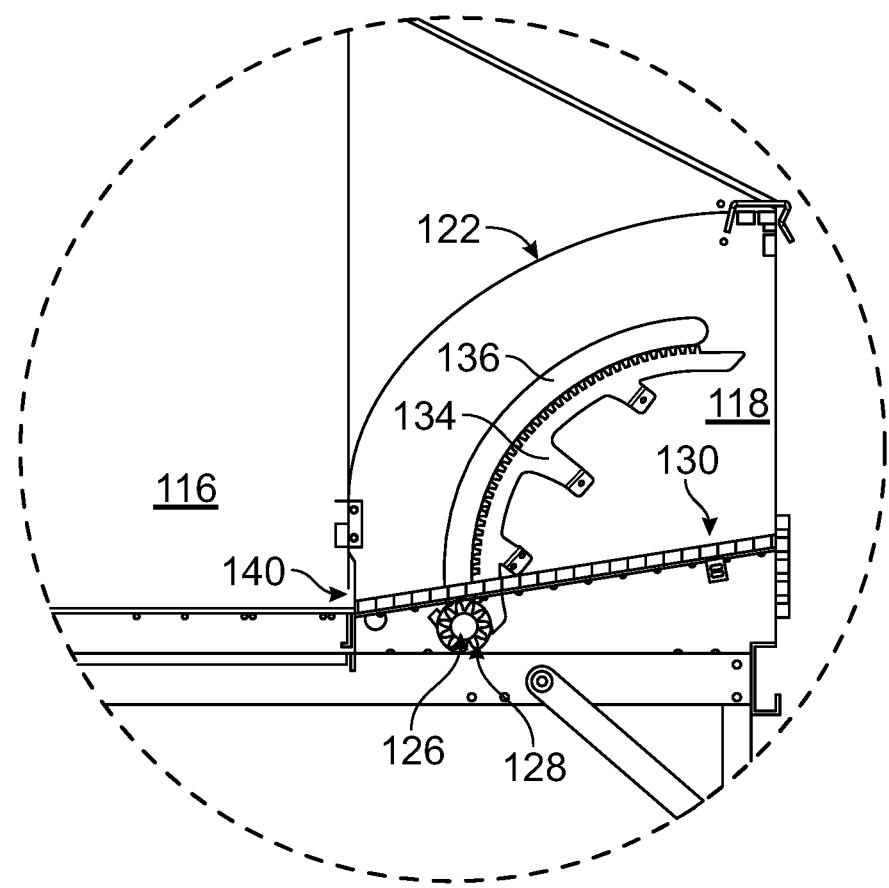
FIG. 13 shows a side elevational view of detail A of FIG. 12.
Figure 14:
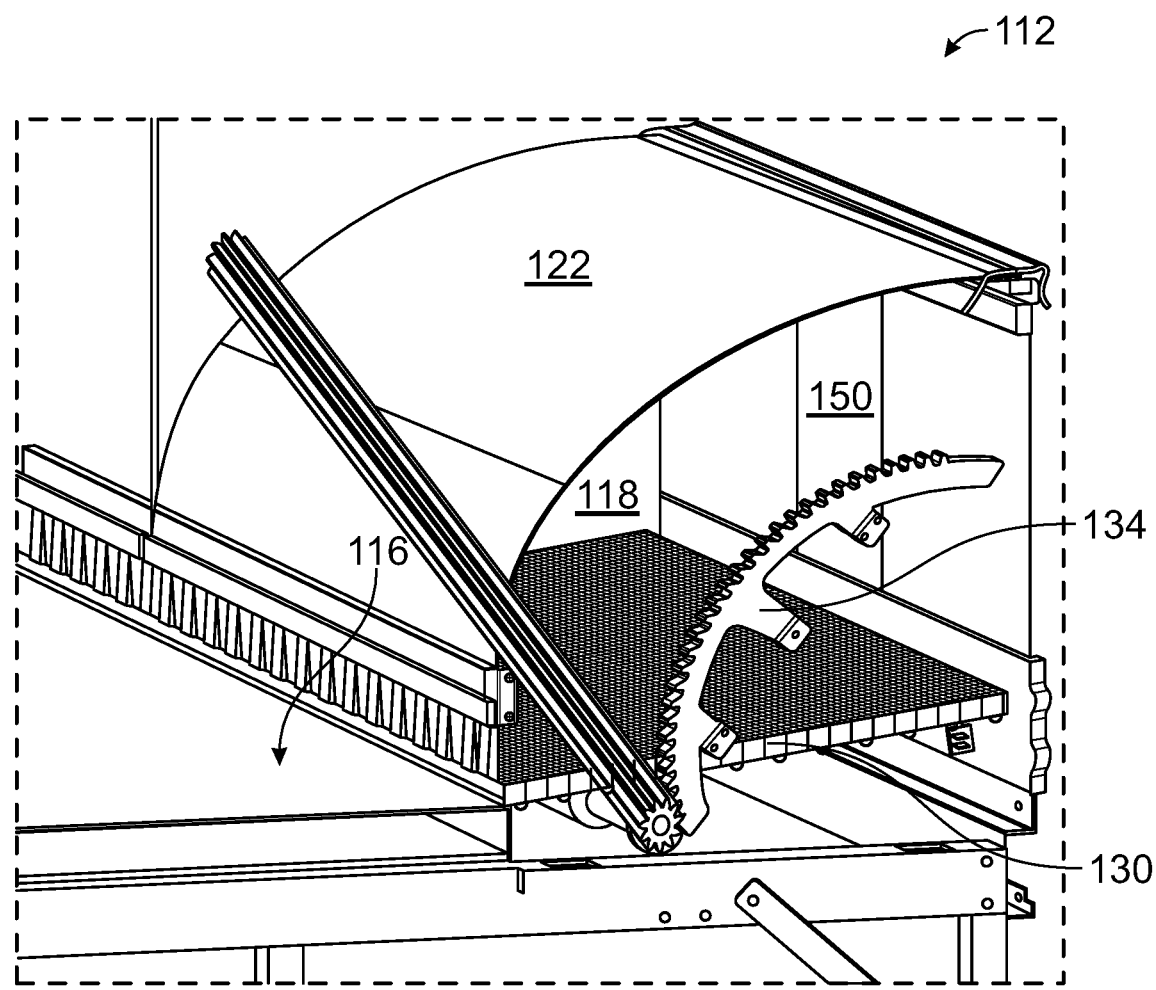
FIG. 14 shows a perspective view similar to detail A of FIG. 12.
Figure 15:
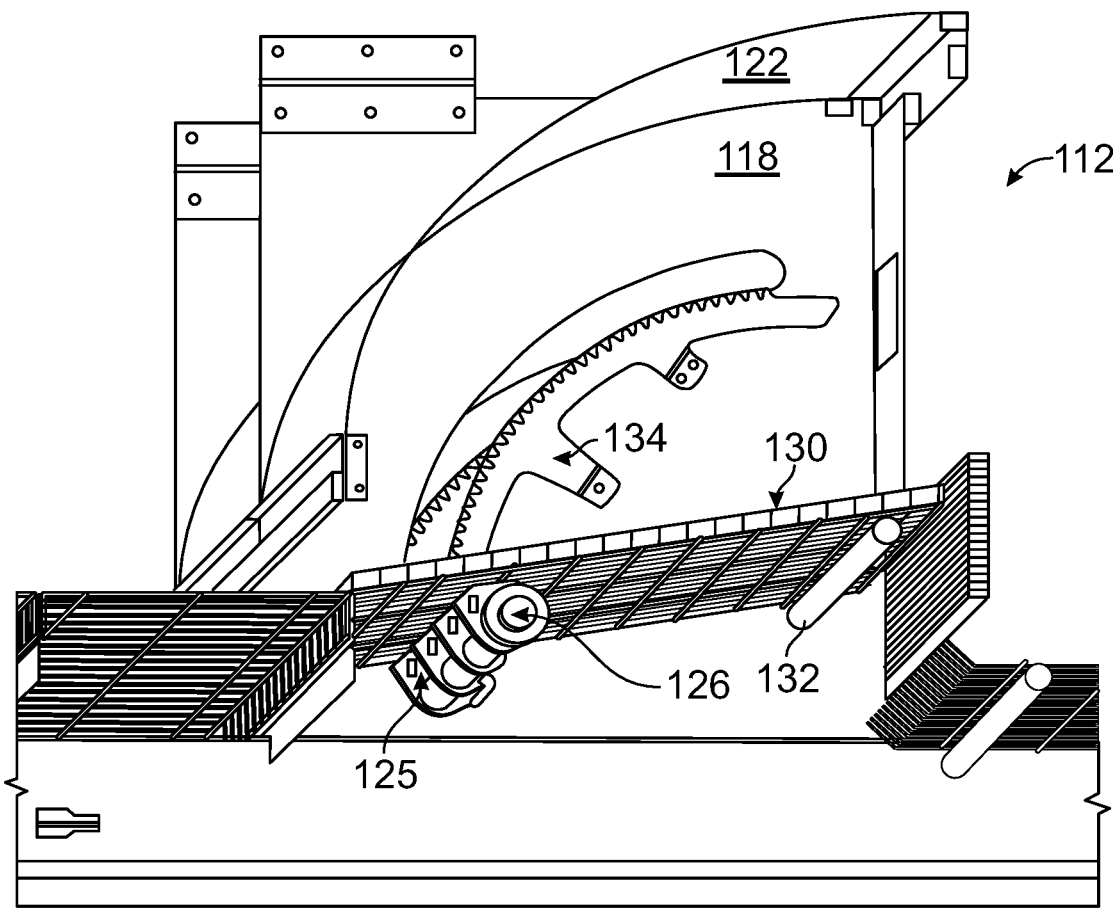
FIG. 15 shows an alternative perspective view similar to detail A of FIG. 12.

The rack drive floor expulsion system of the present invention is shown in more detail in FIGS. 13-15 and comprises at least one shaft 126, which is provided with at least one gear wheel 128, which is fixedly connected with the shaft 126. Further, according to an important aspect of the present invention, the underside of the floor 130 is rotatably connected with the shaft 126 by one or more of downwardly extending supports 125. The floor 130 is further pivotably connected via a support shaft 132 with the box 112. The support shaft 132 is also rotatably supported on the underside of the floor 130 away from the shaft 126 as shown in FIG. 15. The sidewalls 118 are also provided with an opening in which the support shaft 132 is rotatably received.

The expulsion system further comprises at least one preferably arcuate gear rack 134 which is fixedly disposed in or on the box 112 and which is configured for cooperation with the above-mentioned gear wheel(s) 128, such that upon rotation of the shaft 126 the shaft 126 moves along the gear rack 134, thereby carrying along and pivotally raising the floor 130 upwardly and about a pivot point. The pivot point is about the axis of the support shaft 132. In the example shown in FIGS. 11-15, the gear racks 134 are each connected with an associated sidewall 118. The floor 130 is pivotably moveable between first and second positions, for example a tilted horizontal position (see FIG. 11) and an upright position (see FIG. 12), wherein the positions may be separated by an approximately 100 degree angle of rotation. It is contemplated that in some embodiments of the present invention that the gear rack 134 and/or the gear wheel 128 may be disposed outside the box 112. It is contemplated that in some embodiments of the present invention that only one of the gear rack 134 or the gear wheel 128 may be fixedly attached to the box 112.

As shown in FIGS. 13 and 14, an arcuate slot 136 is disposed adjacently above and parallel to the gear rack 134. Accordingly, as the shaft 126 is rotated and as the gear wheels 128 engage the gear rack 134, the shaft 126 is moved upwardly and arcuately to the right along the path defined by the slot 136. As a result, the shaft 126 lifts the floor 130 and tilts it up and about the pivot axis defined by the support shaft 132 thereby selectively removing the hens from the nest 100 and outwardly to the right of the box 112.

Unlike prior art systems, the floor 130 acts as the expulsion plate thereby making possible an expulsion system with fewer parts. As such, the expulsion system occupies a smaller footprint in the box 112 as compared with prior art expulsion systems, thereby maximizing space for the hens nesting therein. Further, with this system, there is no gap associated with prior art systems between the expulsion plate and the floor 130 thereby allowing for more efficient and consistent removal of hens, including deceased birds. The vertical orientation of the floor 130, as best shown in FIG. 13, is configured to promote the removal by gravity of detritus from the floor. This aspect aids in the maintenance, cleaning, and sanitation of the floor as compared to prior art systems where the bottom or floor of the box remains stationary in a substantially horizontal position.

As described herein, preferred embodiments of the present invention require fewer moving parts than comparable prior art systems. For example, the present invention does not require a slidingly movable support shaft as required in the '567 patent.

The invention claimed is:

1. A laying nest for hens comprising:
   a box having a bottom, sidewalls, a back wall, and a roof, wherein the box is configured to house hens and eggs;
   an expulsion system that is configured to remove the hens from the box, wherein the expulsion system comprises:
   a floor;
   a first shaft provided with a gear wheel having a plurality of teeth, the gear wheel being fixedly connected with the first shaft;
   a gear rack having a plurality of teeth that correspond to the teeth of the gear wheel; and
   a second shaft having an axis;
   wherein the floor is both rotatably connected with the first shaft and pivotably connected with the box via the second shaft;
   wherein the gear rack is both fixedly arranged in at least one of the sidewalls of the box and configured for cooperation with said gear wheel;
   wherein upon rotation of the first shaft, the first shaft moves along a path extending parallel to the gear rack, thereby pivotably moving the floor by virtue of the first shaft moving along the path extending parallel to the gear rack and the second shaft pivoting around the axis, and wherein at least a portion of the path is substantially vertical;
   wherein the floor is pivotably movable between first and second positions; and
   wherein the first and second positions are rotationally separated by up to approximately 100 degrees.

2. The laying nest according to claim 1, wherein one of the first and second positions is a substantially vertical position, and the floor is thereby configured to promote the removal by gravity of detritus from the floor.

3. The laying nest according to claim 1, wherein the first shaft is located between the back wall and the second shaft.

4. The laying nest according to claim 1, wherein the floor is rotatably connected to the first shaft by a plurality of supports.

5. The laying nest according to claim 1, wherein the floor is rotatably connected with the first shaft by a plurality of supports extending downwardly from the underside of the floor.

6. The laying nest according to claim 1, the box defining an opening configured to allow the eggs to roll out of the box and the floor being pivotably movable between a first position and a second position, wherein when the floor is moving toward the second position the floor is moving away from the opening.

7. The laying nest according to claim 1, wherein the floor is implemented as a wire mesh mat.

8. The laying nest according to claim 1, wherein the first and second positions are rotationally separated by at least 90 degrees.

9. A laying nest for hens comprising:
a box having a bottom, sidewalls, a back wall, a roof, a front opening, and a back opening;
an expulsion system that is configured to remove the hens from the box, wherein the expulsion system comprises:
a floor;
a first shaft provided with a gear wheel having a plurality of teeth, the gear wheel being fixedly connected with the first shaft;
a gear rack having a plurality of teeth that correspond to the teeth of the gear wheel; and
a second shaft having an axis;
wherein the floor is both rotatably connected with the first shaft and pivotably connected with the box via the second shaft;
wherein the gear rack is both fixedly arranged in at least one of the sidewalls of the box and configured for cooperation with said gear wheel;
wherein upon rotation of the first shaft, the first shaft moves along a path extending parallel to the gear rack, thereby pivotably moving the floor by virtue of the first shaft moving along the path extending parallel to the gear rack and the second shaft pivoting around the axis, and wherein at least a portion of the path is substantially vertical;
wherein the floor is pivotably movable between first and second positions; and
wherein the first position tilts toward the back opening and the second position tilts toward the front opening; and
wherein the first and second positions are rotationally separated by up to approximately 100 degrees.

10. The laying nest according to claim 9, wherein the second position is a substantially vertical position, and the floor is thereby configured to promote the removal by gravity of detritus from the floor.

11. The laying nest according to claim 9, wherein the first shaft is located between the back wall and the second shaft.

12. The laying nest according to claim 9, wherein the floor is rotatably connected to the first shaft by a plurality of supports.

13. The laying nest according to claim 9, wherein the floor is rotatably connected with the first shaft by a plurality of supports extending downwardly from the underside of the floor.

14. The laying nest according to claim 9, wherein when the floor is in the first position it is configured to allow eggs laid in the box to roll down the floor toward the back opening, and wherein when the floor is in the second position it is configured to move hens in the box toward the front opening.

15. The laying nest according to claim 9, wherein the floor is implemented as a wire mesh mat.

16. The laying nest according to claim 9, wherein the first and second positions are rotationally separated by at least 90 degrees.

\* \* \* \* \*